(12) United States Patent
Kitoh

(10) Patent No.: US 11,531,816 B2
(45) Date of Patent: Dec. 20, 2022

(54) SEARCH APPARATUS BASED ON SYNONYM OF WORDS AND SEARCH METHOD THEREOF

(71) Applicant: Ricoh Company, Ltd., Tokyo (JP)

(72) Inventor: Naoya Kitoh, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 185 days.

(21) Appl. No.: 16/515,242

(22) Filed: Jul. 18, 2019

(65) Prior Publication Data

US 2020/0026758 A1    Jan. 23, 2020

(30) Foreign Application Priority Data

Jul. 20, 2018 (JP) .............................. JP2018-137236

(51) Int. Cl.
*G06F 40/30*        (2020.01)
*G06F 16/242*       (2019.01)
(Continued)

(52) U.S. Cl.
CPC ............ *G06F 40/30* (2020.01); *G06F 3/0237* (2013.01); *G06F 16/243* (2019.01);
(Continued)

(58) Field of Classification Search
CPC ...... G06F 40/30; G06F 40/279; G06F 40/247; G06F 40/205; G06F 16/243;
(Continued)

(56) References Cited

U.S. PATENT DOCUMENTS 5,696,962 A * 12/1997 Kupiec ............... G06F 16/3338
2004/0186831 A1 * 9/2004 Hiratsuka ............ G06F 16/334
(Continued)

FOREIGN PATENT DOCUMENTS

JP          4-032966         2/1992
JP          2004-287696 A    10/2004
(Continued)

OTHER PUBLICATIONS

Extended European Search Report dated Oct. 18, 2019 in Patent Application No. 19185870.3, 8 pages.

*Primary Examiner* — Andrew R Dyer
(74) *Attorney, Agent, or Firm* — Xsensus LLP

(57) ABSTRACT

A search apparatus includes a memory and circuitry. The memory is configured to store second sentences in association with past-input first sentences, and store synonyms corresponding to each of a plurality of words. The circuitry is configured to divide each of the past-input first sentences into words and divide a newly-input first sentence into words; select, from the synonyms corresponding to each of the plurality of words, synonyms corresponding to each of the words obtained by dividing each of the past-input first sentences, in descending order of appearance frequency of the words; store the selected synonyms; detect, from the selected synonyms, synonyms corresponding to each of the words obtained by dividing the newly-input first sentence; and retrieve, from the memory storing the second sentences, at least one of the second sentences corresponding to the newly-input first sentence based on the detected synonyms and the words of the newly-input first sentence.

6 Claims, 11 Drawing Sheets

(51) Int. Cl.
  *G06F 40/279* (2020.01)
  *G06F 40/247* (2020.01)
  *G06F 40/205* (2020.01)
  *G06F 3/023* (2006.01)
  *H04L 51/02* (2022.01)

(52) U.S. Cl.
  CPC ........ *G06F 40/205* (2020.01); *G06F 40/247* (2020.01); *G06F 40/279* (2020.01); *H04L 51/02* (2013.01)

(58) Field of Classification Search
  CPC ............ G06F 16/3329; G06F 16/3338; G06F 3/0237; H04L 51/02
  USPC ......................................................... 707/739
  See application file for complete search history.

(56) References Cited

U.S. PATENT DOCUMENTS

| | | | |
|---|---|---|---|
| 2007/0022099 A1* | 1/2007 | Yoshimura | G06F 16/3329 |
| 2009/0112828 A1 | 4/2009 | Rozenblatt | |
| 2011/0047138 A1* | 2/2011 | Dong | G06F 16/951 |
| | | | 707/706 |
| 2011/0276580 A1* | 11/2011 | Press | G06F 16/243 |
| | | | 707/759 |
| 2013/0238601 A1 | 9/2013 | Kanemoto et al. | |
| 2015/0127323 A1* | 5/2015 | Jacquet | G06F 40/211 |
| | | | 704/9 |
| 2015/0339290 A1* | 11/2015 | Mueller | G06F 16/3344 |
| | | | 704/9 |
| 2015/0339574 A1* | 11/2015 | Allen | G06F 16/2365 |
| | | | 706/11 |
| 2016/0239489 A1* | 8/2016 | Cunico | G06F 16/435 |
| 2017/0091170 A1 | 3/2017 | Cardillo | |
| 2017/0206453 A1* | 7/2017 | Kaufmann | G06N 5/04 |
| 2017/0242915 A1 | 8/2017 | Torisawa et al. | |
| 2018/0060297 A1* | 3/2018 | Wegryn | G06F 16/3344 |
| 2018/0349343 A1* | 12/2018 | Bull | G06F 40/211 |
| 2018/0373696 A1* | 12/2018 | Terry | G06N 5/003 |
| 2018/0373782 A1* | 12/2018 | Liu | G06F 40/284 |
| 2019/0130311 A1* | 5/2019 | Anders | G06N 5/041 |
| 2019/0325023 A1* | 10/2019 | Awadallah | G06N 20/00 |
| 2020/0007380 A1* | 1/2020 | Chen | H04L 41/046 |
| 2020/0257860 A1* | 8/2020 | Lu | G06F 40/247 |
| 2020/0311073 A1* | 10/2020 | Tomita | G06F 16/3329 |
| 2021/0049195 A1* | 2/2021 | Kawakami | G06F 16/3344 |

FOREIGN PATENT DOCUMENTS

| | | |
|---|---|---|
| JP | 2013-214294 A | 10/2013 |
| JP | 2016-021136 | 2/2016 |

* cited by examiner

FIG. 5

QUESTION DB

| ID | QUESTION | ANSWER |
|---|---|---|
| 1 | HOW TO WRITE A PATENT SPECIFICATION | Please see here. URL |
| 2 | HOW TO BUY A PC | Please see here. URL |
| 3 | HOW TO DISCARD A PC | Please see here. URL |

FIG. 6

| QUESTION ID | QUESTION WORD |
|---|---|
| 1 | PATENT, WRITE |
| 2 | PC, BUY |
| 3 | PC, DISCARD |
| 4 | PC, SEARCH |
| 5 | PATENT, SEARCH |

| SYNONYM ID | SYNONYM |
|---|---|
| 1 | PATENT, PATENT RIGHT |
| 2 | PC, PERSONAL COMPUTER |
| 3 | SUMMER, SUMMERTIME |
| 4 | BUY, PURCHASE |
| 5 | RETRIEVE, SEARCH |
| ⋮ | |
| 100000 | AMELIORATION, IMPROVEMENT |

FIG. 8

| QUESTION ID | SYNONYM ID |
|---|---|
| 1 | 1 |
| 2 | 2 |
| 2 | 4 |
| 3 | 2 |
| 4 | 2 |
| 4 | 5 |
| 5 | 1 |
| 5 | 5 |

- TWICE
- THREE TIMES
- TWICE

FIG. 9

CUSTOMER SYNONYM DB

| ID | SYNONYM |
|---|---|
| 1 | PC, PERSONAL COMPUTER |
| 2 | PATENT, PATENT RIGHT |
| 5 | RETRIEVE, SEARCH |

⋮

SEARCH APPARATUS BASED ON SYNONYM OF WORDS AND SEARCH METHOD THEREOF

CROSS-REFERENCE TO RELATED APPLICATION

This patent application is based on and claims priority pursuant to 35 U.S.C. § 119(a) to Japanese Patent Application No. 2018-137236, filed on Jul. 20, 2018, the entire disclosure of which is incorporated herein by reference.

BACKGROUND

Technical Field

Embodiments of the present disclosure relate to a search apparatus and a search method.

Description of the Related Art

Today, so-called chatbots are known that perform pattern recognition of text, voice or an image input from a user via a cloud, and perform conversation, answering questions, controlling devices, and the like. As the chatbots, there are known: a choice-type chatbot that selectively performs conversation on the basis of a determined scenario, a dictionary-type chatbot that responds to a registered word, and a log-type chatbot that uses a conversation log to make a response close to context, and the like.

A search apparatus, such as a chatbot, recognizes, for example, a question input from the user, and returns an answer, or the like, with reference to a dictionary, or the like, on the basis of the recognition result. When referring to the dictionary, if a synonym of a word included in the user's question can also be used to refer to the dictionary, an answer having a high probability of matching the user's question can be retrieved from the dictionary. In addition, as the number of synonyms registered is larger, an answer having a higher probability of matching the user's question can be retrieved from the dictionary.

SUMMARY

Embodiments of the present disclosure describe a search apparatus including a memory and circuitry. The memory is configured to store second sentences in association with past-input first sentences, and store synonyms corresponding to each of a plurality of words. The circuitry is configured to: divide each of the past-input first sentences into words and divide a newly-input first sentence into words; select, from the synonyms corresponding to each of the plurality of words stored in the memory, synonyms corresponding to each of the words obtained by dividing each of the past-input first sentences, in descending order of appearance frequency of the words; store the selected synonyms in the memory; detect, from the selected synonyms stored in the memory, synonyms corresponding to each of the words obtained by dividing the newly-input first sentence; and retrieve, from the memory storing the second sentences, at least one of the second sentences corresponding to the newly-input first sentence based on the detected synonyms and the words of the newly-input first sentence.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a table illustrating an example of questions and answers stored in a question DB, according to an embodiment of the present disclosure;

FIG. 6 is a table illustrating an example of an analysis result obtained from an analyzer, according to an embodiment of the present disclosure;

FIG. 7 is a table illustrating an example of synonyms stored in a synonym DB, according to an embodiment of the present disclosure;

FIG. 8 is a table illustrating a state in which a question ID and a synonym ID are associated and registered in a question synonym DB, according to an embodiment of the present disclosure;

FIG. 9 is a table illustrating synonyms registered in the customer synonym DB, according to an embodiment of the present disclosure;

Figure 1:
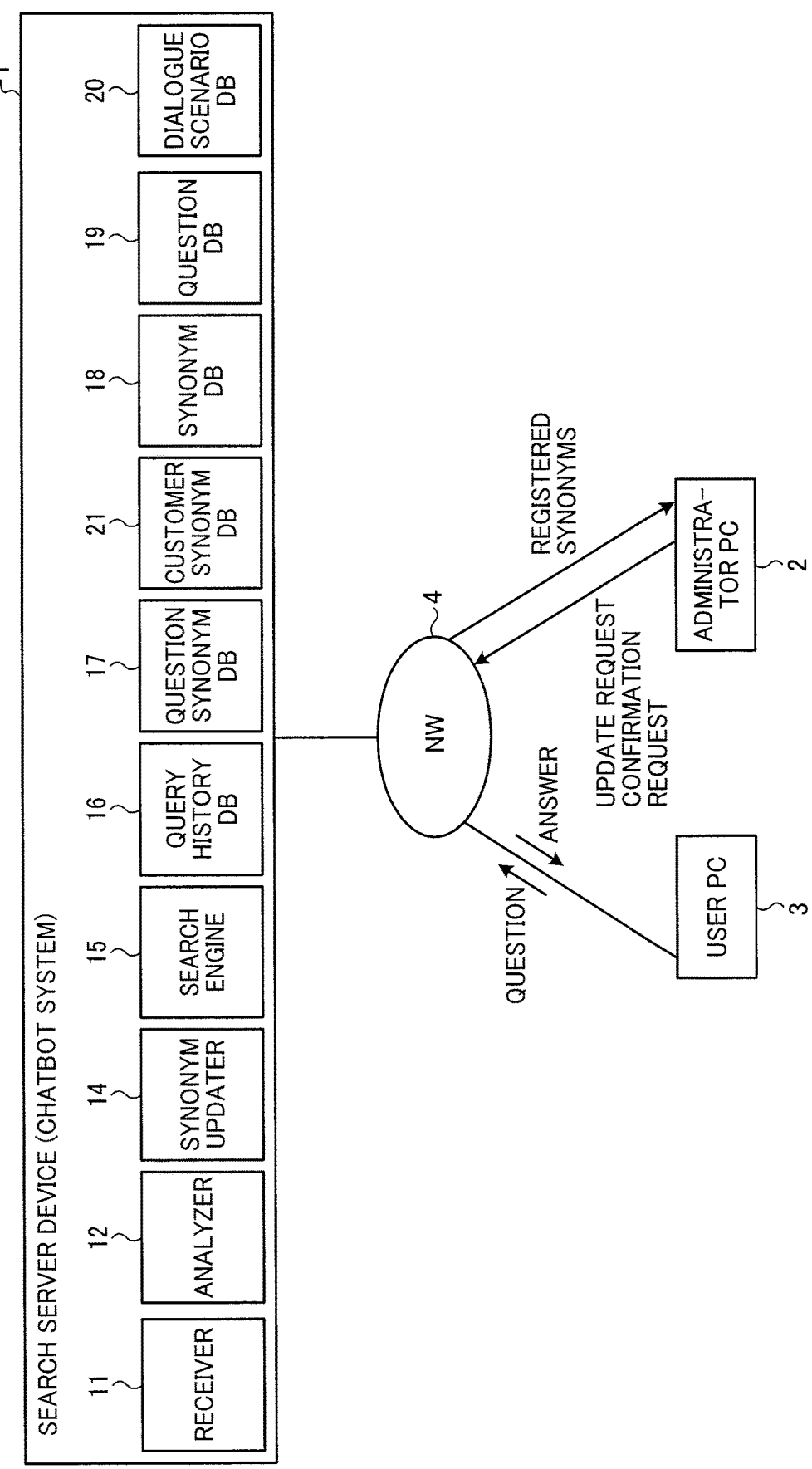
FIG. 1 is a system configuration diagram of a chatbot system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

In the following description, a chatbot system according to an embodiment as an application example of a search apparatus, a search method, and a search program will be described.

(System Configuration)

FIG. 1 is a system configuration diagram of a chatbot system according to an embodiment. As illustrated in FIG. 1, the chatbot system according to the embodiment includes a search server apparatus 1, a personal computer device (administrator PC) 2 of an administrator, and a personal computer device (user PC) 3 of a user, which are mutually connected via, for example, a network (NW) 4 such as the Internet (or local area network (LAN)).

The search server apparatus 1 includes a receiver 11, an analyzer 12, a synonym updater 14, a search engine 15, a query history database (query history DB) 16, and a question synonym database (question synonym DB) 17. In addition, the search server apparatus 1 includes a synonym database (synonym DB) 18, a question database (question DB) 19, a dialogue scenario database (dialogue scenario DB) 20, and a customer synonym database (customer synonym DB) 21.

The question DB 19 is an example of a second sentence storage unit. The analyzer 12 is an example of a dividing unit. The synonym DB 18 is an example of a synonym storage unit. The customer synonym DB 21 is an example of a selected synonym storage unit. The search engine 15 is an example of a retrieving unit.

The receiver 11 is a communication unit, and communicates between the administrator PC 2 and the user PC 3 via the network 4. In addition, the receiver 11 receives a question from the user PC 3 and a request for updating the customer synonym DB 21 from the administrator PC 2. The analyzer 12 performs a so-called morphological analysis that divides a question, or the like, from the user PC 3 into a plurality of words. In response to the update request from the administrator PC 2, the synonym updater 14 selects, for example, 10,000 words corresponding to a word frequently used in the user's question from among the 100,000 synonyms stored in the synonym DB 18, and registers the words in the customer synonym DB 21.

The search engine 15 retrieves an answer corresponding to the user's question from the question DB 19 with reference to a scenario stored in the dialogue scenario DB 20 and the synonyms registered in the customer synonym DB 21, or the like, and transmits the answer to the user PC 3. With this, the search engine 15 performs a conversation (chat) with the user, for example, by text. A number of synonyms that can be handled by the search engine 15 is limited to, for example, 10,000 words by the specification of the search engine 15. The user's question is an example of a first sentence, and the answer to the question is an example of a second sentence.

The history of questions (queries) from the user is stored in the query history DB 16. In the question synonym DB 17, synonyms stored in the synonym DB 18 related to the words included in the question from the user are associated and stored. The synonym DB 18 stores, for example, 100,000 synonyms. As will be described later, out of 100,000 synonyms stored in the synonym DB 18, 10,000 synonyms related to the words often included in the user's question, or the like, are selected and registered in the search engine 15.

In the question DB 19, a question from the user and an answer to each question are associated and stored. The dialogue scenario DB 20 stores conversational scenario information corresponding to an input from the user. Out of 100,000 synonyms stored in the synonym DB 18, 10,000 synonyms related to the words often included in the user's question, or the like, are selectively registered in the customer synonym DB 21.

(Hardware Configuration of Search Server Apparatus)

Figure 2:
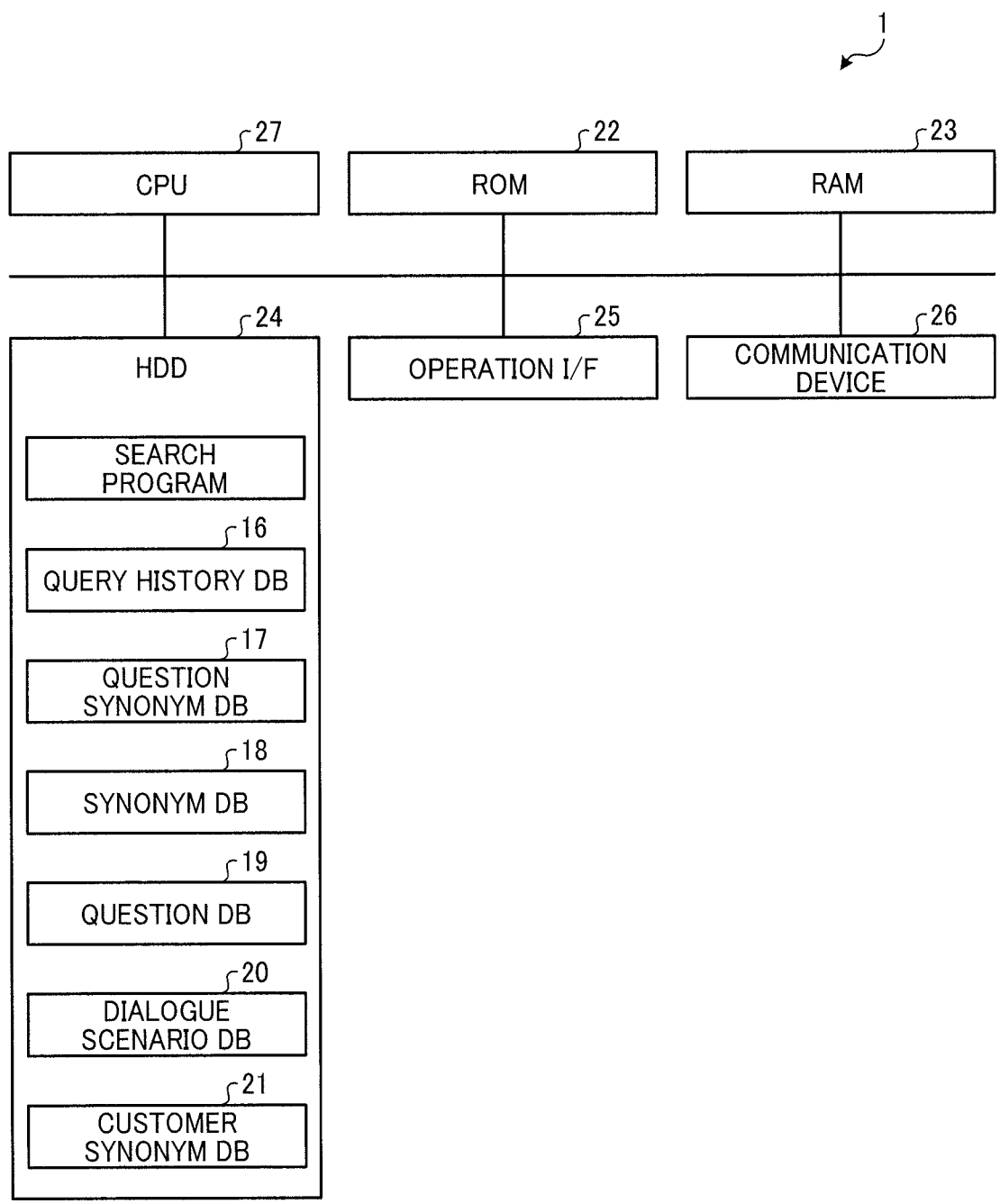
FIG. 2 is a diagram illustrating a hardware configuration of a search server apparatus provided in the chatbot system, according to an embodiment of the present disclosure.

FIG. 2 is a diagram illustrating a hardware configuration of the search server apparatus 1. As illustrated in FIG. 2, the search server apparatus 1 includes a central processing unit (CPU) 27, a read only memory (ROM) 22, a random access memory (RAM) 23, a hard disk drive (HDD) 24, an operation interface (operation I/F), and a communication device 26.

The HDD 24 stores a search program. As described later, the CPU 27 performs registration control and update control of synonyms with respect to the search server apparatus 1 on the basis of the search program. In addition, the query history DB 16 through the customer synonym DB 21 are provided in the HDD 24.

In the description of this embodiment, the query history DB 16 through the customer synonym DB 21 are provided in the HDD 24 of the search server apparatus 1. However, a part or all of the query history DB 16 through the customer synonym DB 21 may be provided on the network 4 outside the search server apparatus 1 with which the search server apparatus 1 can communicate.

The ROM 22 stores the operation system (OS) of the search server apparatus 1, and the like. The CPU 27 develops and executes the receiver 11, the analyzer 12, the synonym updater 14, and the search engine 15 on the RAM 23 on the basis of the search program. An input device, such as a keyboard and a mouse device, is connected to an operation interface (I/F) 25 according to need. The communication device 26 communicates with the administrator PC 2 and the user PC 3 via the network 4.

(Overall Operation)

Figure 3:
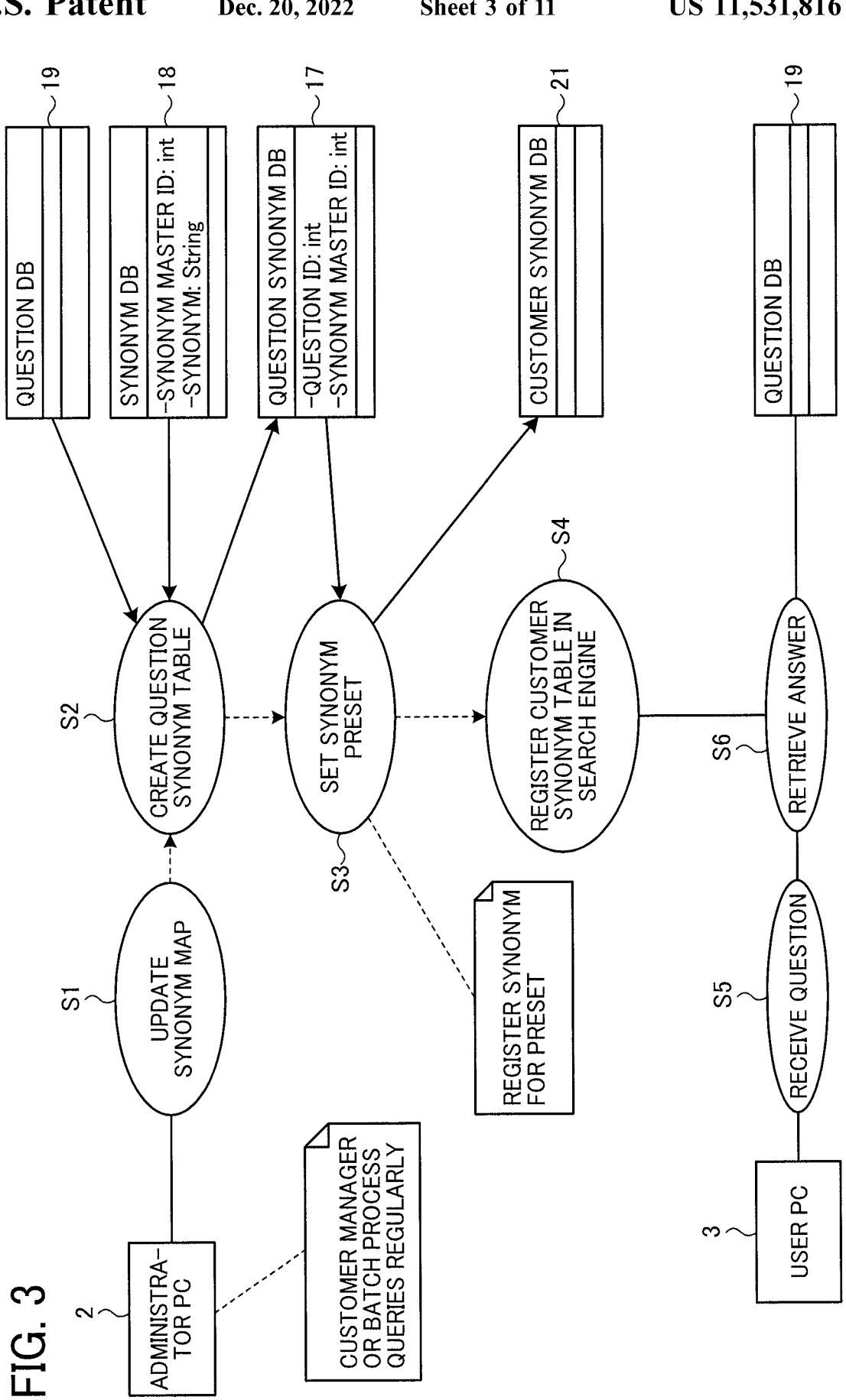
FIG. 3 is a diagram schematically illustrating an overall operation of the chatbot system, according to an embodiment of the present disclosure.

FIG. 3 is a diagram schematically illustrating an overall operation of the chatbot system according to the embodiment. In this FIG. 3, when registering or updating synonyms with respect to the search server apparatus 1, an administrator makes a registration request or update request of synonyms with respect to the search server apparatus 1 via the administrator PC 2 (step S1). When this request is received, the search server apparatus 1 analyzes the words contained in the question from the user, that are stored in the question DB 19, and retrieves synonyms corresponding to the analyzed words from the synonym DB 18 in which 100,000 words are registered. Then, the search server apparatus 1 selects, from among the analyzed words, 10,000 pairs of words and synonyms in a descending order of appearance frequency to create a question synonym table (step S2).

That is, the search server apparatus 1 retrieves from the synonym DB 18 a word with the highest frequency of appearance and a synonym corresponding to this word and registers the word and synonym in the question synonym table, and retrieves from the synonym DB 18 a word with the second highest frequency of appearance and a synonym corresponding to this word and registers the word and synonym in the question synonym table, and retrieves from the synonym DB 18 a word with the third highest frequency of appearance and a synonym corresponding to this word and registers the word and synonym in the question synonym table. The search server apparatus 1 repeats this operation 10,000 times. As a result, among the synonyms registered in 100,000 words in the synonym DB 18, 10,000 synonyms selected in the order of word appearance frequency are registered in the question synonym table.

Next, the search server apparatus 1 stores the formed question synonym table in the question synonym DB 17. The question synonym DB 17 is information for the administrator to confirm currently registered synonyms. That is, when a request for displaying registered synonyms is made via the administrator PC 2, the synonym updater 14 of the search server apparatus 1 reads out the question synonym table registered in the question synonym DB 17, and transmits the question synonym table to the administrator PC 2 via the receiver 11. With this, the administrator can confirm the currently registered synonyms via the administrator PC 2.

In addition, the search server apparatus 1 stores the formed query synonym table in the customer synonym DB 21, and performs a notification (registration) to the search engine that the registration of synonyms in the customer synonym DB 21 is completed and the synonyms can be referred to (step S4).

Upon receipt of a question from the user (step S5), the search engine 15 retrieves from the customer synonym DB 21 the word and synonym included in the received question, and retrieves from the question DB 19 the answer to the words and synonym retrieved from the customer synonym DB 21 (step S6). Then, the answer retrieved from the question DB 19 is transmitted to the user PC 3. The user's question thereby can be answered.

In the chatbot system of the embodiment, when answering a question received from the user, the customer synonym DB 21 is referred to on the basis of the words and synonyms included in the question. In the customer synonym DB 21, 10,000 pairs of words and synonyms with high frequency of appearance are selected and stored. Therefore, by referring to the question DB 19 and retrieving an answer on the basis of the words and synonyms obtained from the customer synonym DB 21, it is possible to retrieve an answer having a high probability of being correct with respect to the user's question, and the accuracy of the chatbot system can be improved.

In addition, in the customer synonym DB 21, 10,000 pairs of words and synonyms with high frequency of appearance are selected from the synonym DB 18 and stored. Therefore, even if synonyms that can be handled by the search engine 15 are limited to 10,000 words, 10,000 synonyms with high frequency of appearance can be stored in the customer synonym DB 21. Thus, an answer having a high probability of matching the user's question can be retrieved from the question DB 19 and provided to the user. That is, even when the number of synonyms that can be handled is limited, it is possible to retrieve an answer matching the user's question with high accuracy.

(Update Operation of Customer Synonym DB)

Figure 4:
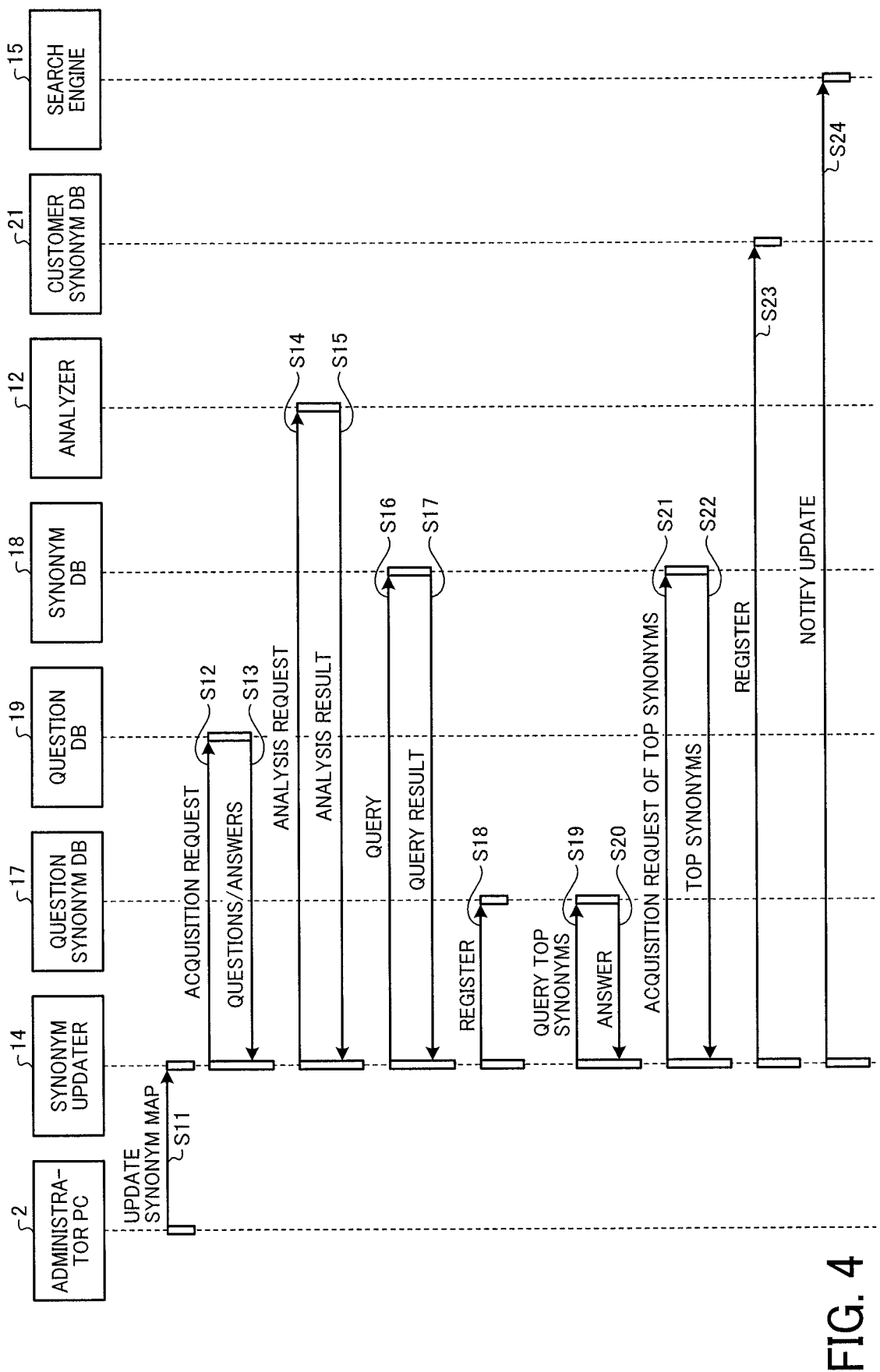
FIG. 4 is a sequence diagram for explaining in detail an update operation of a customer synonym DB, according to an embodiment of the present disclosure.

Next, an update operation of the customer synonym DB 21 will be described in detail with the use of the sequence diagram of FIG. 4. First, the administrator uses the administrator PC 2 to make a request for updating a synonym map (step S11). The update request is received by the receiver 11 of the search server apparatus 1 and notified to the synonym updater 14.

The synonym updater 14 requests acquisition of all questions and all answers stored in the question DB 19 (step S12), and acquires all the questions and answers from the question DB 19 (step S13). FIG. 5 illustrates an example of the questions and answers stored in the question DB 19. In the example illustrated in FIG. 5, a question "HOW TO WRITE A PATENT SPECIFICATION" is registered with a question identification number (question ID) "1", and for this question, a message "Please see here." prompting a user to browse a uniform resource locator (URL) of a page that explains how to write a patent specification and the URL of the page are registered. In addition, in the example illustrated in FIG. 5, a question "HOW TO DISCARD A PC" is registered with a question identification number (question ID) "3", and for this question, a message "Please see here." prompting a user to browse a URL of a page that explains how to discard a PC and the URL of the page are registered. The synonym updater 14 acquires such a question and an answer from the question DB 19.

Next, the synonym updater 14 requests the analyzer 12 to analyze all the acquired questions and the answers (step S14). The analyzer 12 performs, for example, a morphological analysis, thereby dividing the questions and answers of each question ID into words. Then, the analyzer 12 notifies the synonym updater 14 of the word obtained from each question and each answer together with a corresponding question ID (step S15).

FIG. 6 is a table illustrating an example of an analysis result obtained from the analyzer 12. The example of FIG. 6 indicates that the question "HOW TO WRITE A PATENT SPECIFICATION" of the ID 1 illustrated in FIG. 5 is divided into words such as "PATENT" and "WRITE". In addition, the example of FIG. 6 indicates that the question "HOW TO DISCARD A PC" of the ID 3 illustrated in FIG. 5 is divided into words such as "PC" and "DISCARD".

Next, the synonym updater 14 queries whether each word to be a result of the analysis by the analyzer 12 is stored in the synonym DB 18 (step S16). The synonym DB 18 stores, for example, 100,000 synonyms, as illustrated in FIG. 7. In the example of FIG. 7, synonyms "PATENT" and "PATENT RIGHT" are registered with a synonym ID 1, synonyms "PC" and "PERSONAL COMPUTER" are registered with a synonym ID 2, and synonyms "AMELIORATION" and "IMPROVEMENT" are registered with a synonym ID 100000.

On the basis of the query result (step S17) as to whether the word is stored in the synonym DB 18, the synonym updater 14 associates and registers, the question ID of each word of the question and the synonym ID of the synonym corresponding to each word (the synonym ID of the synonym detected from the synonym DB 18 in step S16), in the question synonym DB 17 (step S18).

FIG. 8 is a table illustrating a state in which a question ID and a synonym ID are associated and registered in the question synonym DB 17. FIG. 8 is an example in which synonyms "PATENT" and "PATENT RIGHT" of the synonym ID 1 are associated and registered with each word of "PATENT" and "WRITE" of the question ID 1. In addition, FIG. 8 is an example in which synonyms "PC" and "PERSONAL COMPUTER" of the synonym ID 2 are associated and registered with each word "PC" and "BUY" of the question ID 2, and synonyms "BUY" and "PURCHASE" of the synonym ID 4 are associated and registered. That is, in the case of each word "PC" and "BUY" of the question ID 2, the synonym ID 2 of "PC" and "PERSONAL COMPUTER" corresponding to the word "PC" is registered as a related synonym, and the synonym ID 4 of "BUY" and "PURCHASE" corresponding to the word "BUY" is registered as a related synonym.

Next, the synonym updater 14 refers to the question synonym DB 17 to query about a number of appearance (frequency of appearance) of each synonym ID among the synonyms stored in association with each question ID (top synonyms query: step S19 and step S20). Then, the synonym updater 14 detects, for example, synonym IDs of the top 10,000 synonyms in a descending order of appearance frequency. Specifically, in the case of the example of FIG. 8, the appearance frequency of the synonym ID "1" is "TWICE", the appearance frequency of the synonym ID "2" is "THREE TIMES", and the appearance frequency of the synonym ID "5" is "TWICE". Therefore, the synonym updater 14 detects the synonym IDs in the order of the synonym ID2, the synonym ID1, the synonym ID5, and so on.

As described above, when 10,000 synonyms are detected in the descending order of appearance frequency, the synonym updater 14 acquires, from the synonym DB 18, 10,000 synonyms corresponding to words with high frequency of appearance (steps S21 and S22). Then, the synonym updater 14 registers in the customer synonym DB 21 the acquired 10,000 synonyms corresponding to the words with high frequency of appearance (step S23). As a result, 10,000 synonyms corresponding to words often included in questions (and answers) can be selected from among 100,000 synonyms, and registered in the customer synonym DB 21.

While 10,000 synonyms that can be handled by the search engine 15 are registered in the customer synonym DB 21, synonyms less than 10,000 words that can be handled by the search engine 15 may be registered.

FIG. 9 is a table illustrating synonyms registered in the customer synonym DB 21. In the case of this example of FIG. 9, the synonyms "PC" and "PERSONAL COMPUTER" of the synonym ID 1, the synonyms "PATENT" and "PATENT RIGHT" of the synonym ID 2, the synonyms "RETRIEVE" and "SEARCH" of the synonym ID 5 are registered in order.

When the registration of the selected synonym is completed in this manner, the synonym updater 14 notifies the search engine 15 (step S24). The notification to the search engine 15 is a notification that the synonym has been registered in the customer synonym DB 21 when the synonym has not been registered in the customer synonym DB 21. In addition, when the synonym is already registered in the customer synonym DB 21, the notification is that the synonym registered in the customer synonym DB 21 has been updated. Such registration and update of synonyms with respect to the customer synonym DB 21 may be performed at a desired timing, such as a timing specified by the administrator, or a time zone at which there are few accesses to the search server apparatus 1, or the like.

As described below, the search engine 15 retrieves an answer to the user's question with the use of the synonym registered in the customer synonym DB 21 and provides the answer to the user in a chat form. For the search engine 15, the number of synonyms that can be handled is limited to 10,000. However, in the case of the chatbot system according to the embodiment, the 10,000 synonyms registered in accordance with the limitation are synonyms corresponding to words with high frequency of appearance in the question. Therefore, the search engine 15 can refer to a synonym corresponding to a word with high frequency of appearance and retrieve an answer corresponding to a question. Consequently, the search accuracy of the chatbot system according to the embodiment can be improved.

(Answer Operation to the Question)

Figure 10:
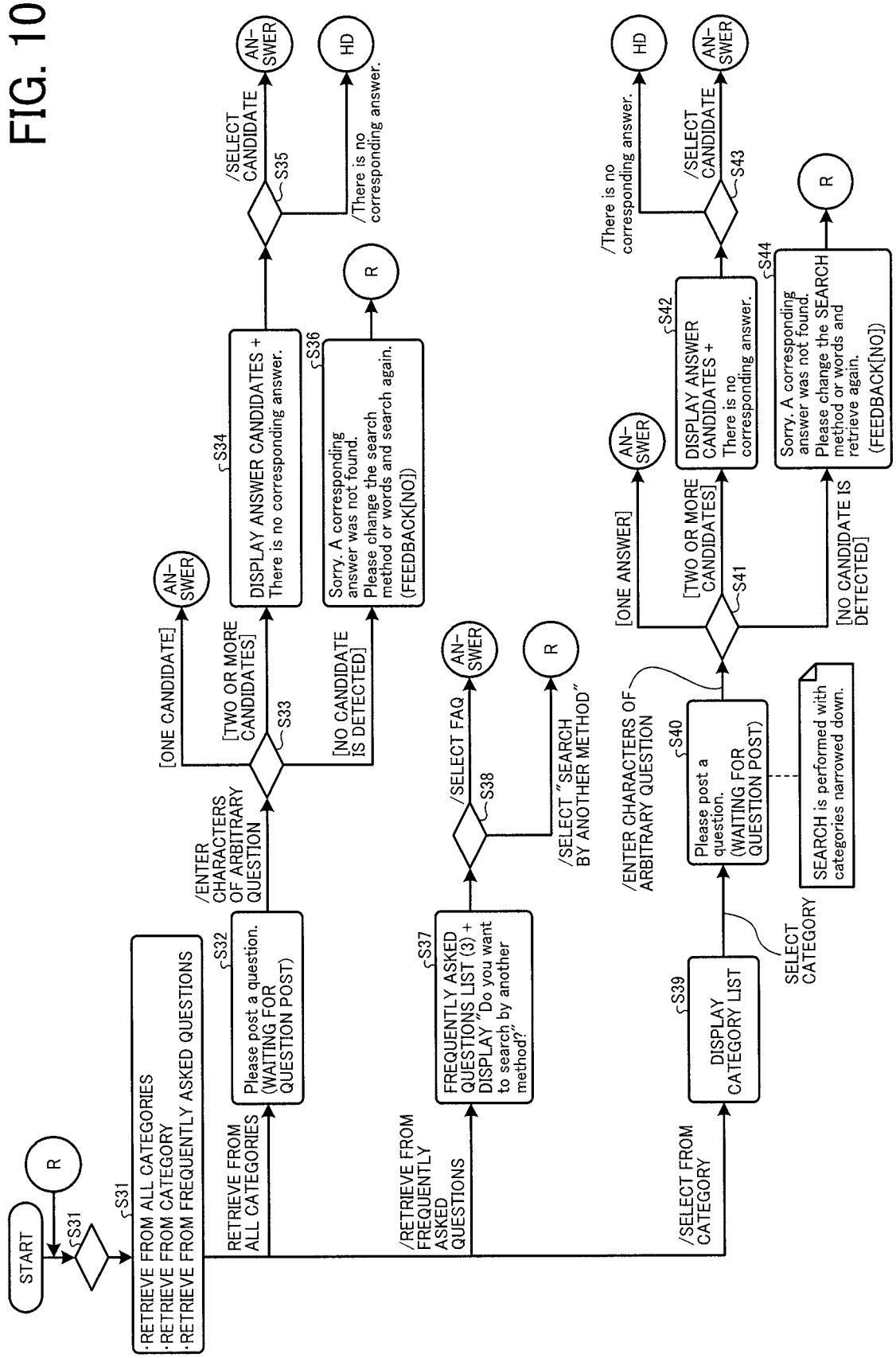
FIG. 10 is a flowchart illustrating a flow of operation until a user's question is answered, according to an embodiment of the present disclosure.

Next, an operation for answering a user's question in a chat form with reference to registered synonyms in the chatbot system according to the embodiment will be described. FIG. 10 is a flowchart illustrating a flow of operation until a user's question is answered. Although this is an example, the search server apparatus 1 provides, for example, a home page of a company, or the like. The home page is provided with a chatbot system that answers a user's question in a chat form. This chatbot system is implemented by the CPU 27 illustrated in FIG. 2 executing a search program stored in the HDD 24.

A user starts a world wide web (Web) browser of the user PC 3 and accesses the search server apparatus 1 via the network 4. With this, the homepage of a company published by the search server apparatus 1 is displayed on the user PC 3 via the Web browser. On this homepage, a question receiving button using a chatbot is provided. For example, when there is a question on a product, or the like, of the company, the user operates the question receiving button on the home page via an input device such as a mouse device. When detecting the operation of the question receiving button, the CPU 27 of the search server apparatus 1 displays a "chat screen for answering a question" on the user PC 3 and starts a process of the flowchart of FIG. 10.

Figure 11:
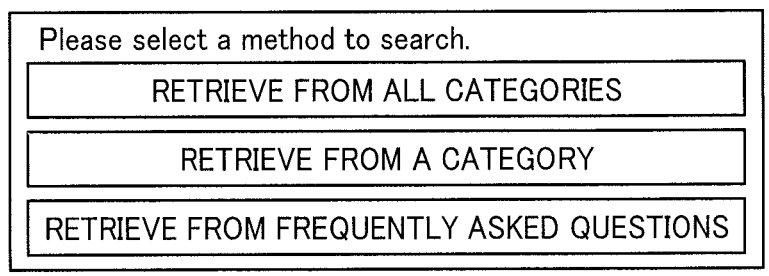
FIG. 11 is a diagram illustrating an example of a chat screen on which a search method selection menu is displayed in the chatbot system, according to an embodiment of the present disclosure.

When the process of the flowchart of FIG. 10 starts, the search engine 15 first displays a search method selection menu on the chat screen on the user PC 3 (step S31). FIG. 11 is a diagram illustrating an example of a chat screen on which the search method selection menu is displayed. FIG. 11 is an example in which each search method "RETRIEVE FROM ALL CATEGORIES", "RETRIEVE FROM A CATEGORY", and "RETRIEVE FROM FREQUENTLY ASKED QUESTIONS" is displayed in characters.

The chatbot system according to the embodiment is a system that answers a user's question in a chat form. Therefore, the user enters a character via an input device, such as a keyboard, thereby specifying a desired search method.

While this example is described assuming that the user inputs a character (text input), an input speech may be voice-recognized, converted into text, and displayed on the chat screen.

(Retrieve from all Categories)

When the search method "RETRIEVE FROM ALL CATEGORIES" is selected by the user, the search engine 15 displays a message prompting input of a question such as "Please post a question." on the chat screen on the user PC 3, and shifts to a state of waiting for the question post (step S32). The user enters characters of a desired question via an input device such as a keyboard.

When the characters of the question are input by the user, the search engine 15 requests the analyzer 12 to perform a morphological analysis of the user's question, and acquires a plurality of words included in the user's question. In addition, the search engine refers to the customer synonym DB 21 on the basis of each acquired word, and retrieves synonyms corresponding to the user's question. Then, the search engine 15 retrieves from the question DB 19 on the basis of the retrieved synonyms.

As described above, the customer synonym DB 21 stores 10,000 synonyms selected from 100,000 synonyms on the basis of past users' questions (and answers). Therefore, the synonym retrieved from the customer synonym DB 21 on the basis of the word included in the user's question is the synonym matching the user's question. Consequently, by retrieving from the question DB 19 with the use of the synonym retrieved from the customer synonym DB 21, it is possible to retrieve a suitable answer to the user's question.

Next, the search engine 15 retrieves from the question DB 19 on the basis of a synonym, thereby determining whether one answer candidate has been retrieved, whether two or more answer candidates have been retrieved, or whether an answer candidate could not have been retrieved (step S33).

(When there is One Answer Candidate)

Figure 12:
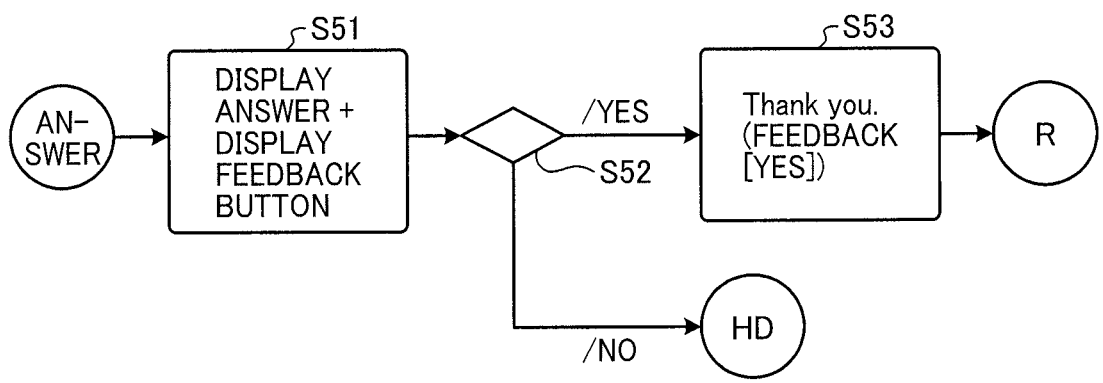
FIG. 12 is a flowchart that is a subroutine of the flowchart of FIG. 10.

When one answer candidate is retrieved from the question DB 19 on the basis of the synonym, the search engine 15 shifts to the subroutine illustrated in FIG. 12, and displays a feedback button (YES/NO) for selecting whether to return the display screen to the initial screen (search method selection screen) of the chat screen, on the chat screen on the user PC 3, together with an answer corresponding to the retrieved answer candidate (step S51).

The search engine 15 monitors the presence or absence of the operation of the feedback button (step S52), and when detecting the operation of the feedback button "YES", displays a message such as "Thank you." on the chat screen (step S53), and returns the process to step S31, and the initial screen (search method selection screen) of the chat screen is displayed on the user PC 3.

On the other hand, when the feedback button "NO" is operated, it means that the answer to the user's question is not displayed, and the user also refuses to return the chat screen to the search method selection screen. Therefore, when the operation of the feedback button "NO" is detected, the search engine 15 shifts to the subroutine illustrated in FIG. 13, and displays on the chat screen an apology message such as "I'm sorry." for not being able to display the answer to the question at this point. In addition, the search engine 15 displays, on the chat screen, a contact address such as a help desk telephone number or an e-mail address together with the apology message, and returns the chat screen to the initial screen (search method selection screen) (step S61). In this case, the user contacts the help desk by telephone, or the like, asks a person in charge, and obtains an answer.

(When there are Two Answer Candidates)

Next, in step S33, when it is determined that there are a plurality of, for example, two answer candidates, the search engine 15 displays, on the chat screen, a "display selection button" of each answer candidate. In addition, the search engine 15 displays a "no answer button" which is operated when there is no answer corresponding to the question in the displayed answer candidates, on the chat screen together with the "display selection button" (step S34).

The search engine 15 monitors the presence or absence of the selection operation of the "display selection button" and the "no answer button" (step S35). When the operation of the "display selection button" is detected, the search engine 15 shifts to the subroutine illustrated in FIG. 12, and displays a feedback button (YES/NO) for selecting whether to return the display screen to the initial screen (search method selection screen) of the chat screen, on the chat screen on the user PC 3, together with an answer corresponding to the selected operated answer candidate (step S51).

The search engine 15 monitors the presence or absence of the operation of the feedback button (step S52), and when detecting the operation of the feedback button "YES", displays a message such as "Thank you." on the chat screen (step S53), and the process returns to step S31, and the initial screen (search method selection screen) of the chat screen is displayed on the user PC 3.

On the other hand, when the feedback button "NO" is operated, it means that the user is not satisfied with the displayed answer, and the user also refuses to return the chat screen to the search method selection screen. Therefore, when the operation of the feedback button "NO" is detected, the search engine 15 shifts to the subroutine illustrated in FIG. 13, and displays on the chat screen an apology message such as "I'm sorry." for not being able to display the answer to the question at this point. In addition, the search engine 15 displays, on the chat screen, a contact address such as a help desk telephone number or an e-mail address together with the apology message, and returns the chat screen to the initial screen (search method selection screen) (step S61). In this case, the user contacts the help desk by telephone, or the like, asks a person in charge, and obtains an answer.

(When No Answer Candidate is Detected)

Next, in step S33, when it is determined that an answer candidate to the question of the user cannot be detected, the search engine 15 displays, on the chat screen, an apology message and a message prompting a search again, such as "Sorry. A corresponding answer was not found. Please change the search method or words and retrieve again." (step S36), and the process returns to step S31, and the initial screen (search method selection screen) of the chat screen is displayed on the user PC 3.

(Retrieve from a Category)

Figure 14:
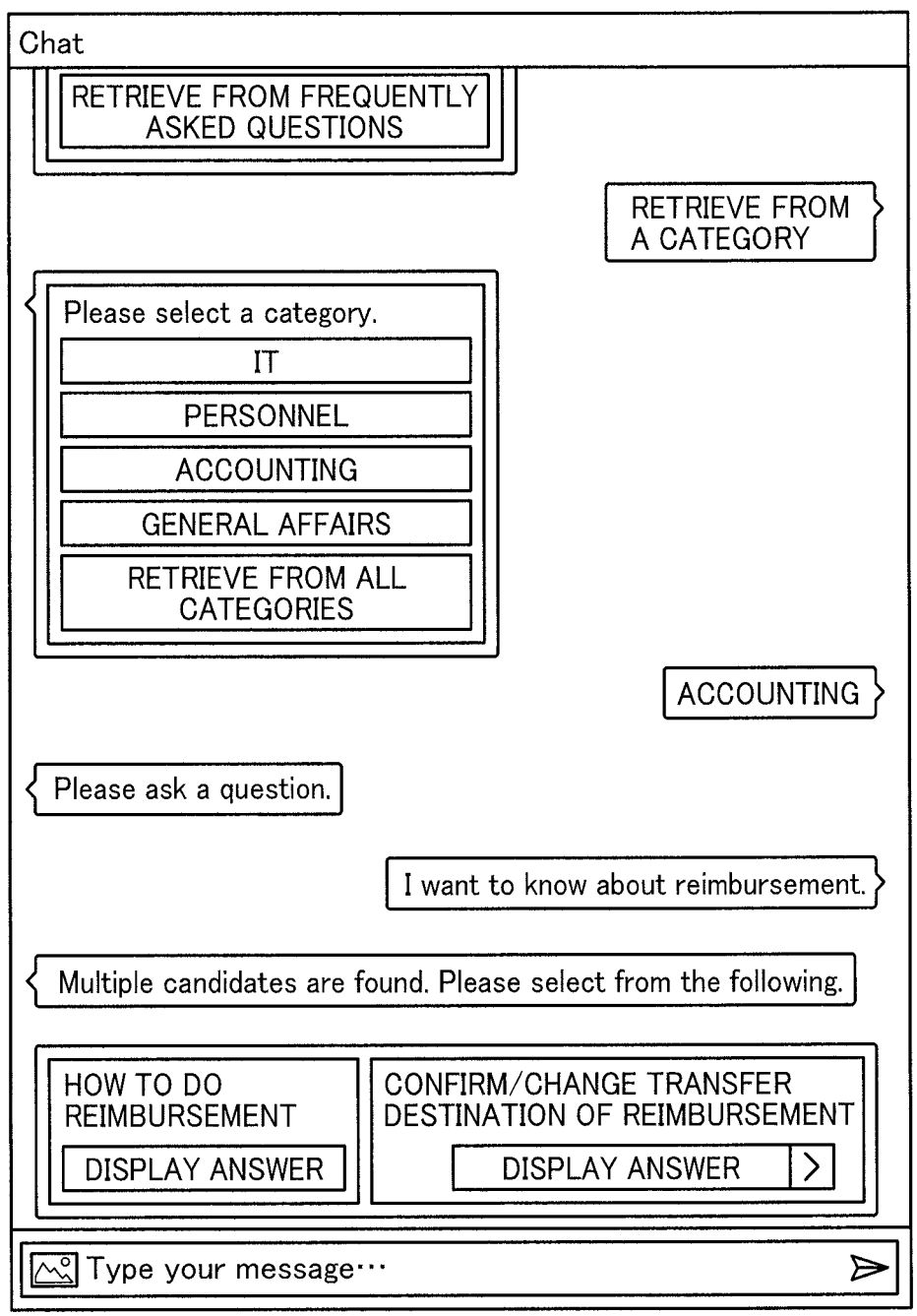
FIG. 14 is a diagram illustrating an example of a chat screen when a question is selected from categories in the chatbot system, according to an embodiment of the present disclosure.

Next, when selecting the search method of "RETRIEVE FROM A CATEGORY" from the search method selection menu illustrated in FIG. 11, as illustrated in FIG. 14, the user operates the user PC 3 and enters the characters "RETRIEVE FROM A CATEGORY" on the chat screen.

For example, as illustrated in FIG. 14, when a character input of "RETRIEVE FROM A CATEGORY" is detected, the search engine 15 displays, on the chat screen, a list of category names of categories selectable by the user (step S39). In the example of FIG. 14, the category names of selectable categories such as "Information Technology (IT)", "PERSONNEL", "ACCOUNTING", "GENERAL AFFAIRS" and "RETRIEVE FROM ALL CATEGORIES" are listed exemplary on the chat screen.

For example, as illustrated in FIG. 14, the user inputs the characters "ACCOUNTING" to specify a desired category for desired search. When a category is specified by the user, the search engine 15 displays a message prompting the input of a question such as "Please ask a question." on the chat screen, and shifts to a state of waiting for a question input (step S40). In addition, when the category is specified by the user, the search engine 15 acquires, from the question DB 19, a question and an answer corresponding to the specified category.

That is, when the search method of "RETRIEVE FROM ALL CATEGORIES" described above is selected, the search engine 15 performs a search with reference to the questions and answers of all the categories stored in the question DB 19. On the other hand, when the category is selected by the user, the search engine 15 acquires a question and an answer corresponding to the selected category from the question DB 19 and performs a search. With this, it is possible to reduce the amount of information of questions and answers to be retrieved, and to shorten the search time.

Next, the user performs an input operation on a question for the selected category. The example of FIG. 14 is an example in which the user's question "I want to know about reimbursement." is input to the category of "ACCOUNTING".

In this manner, when the characters of the question are input by the user, the search engine 15 requests the analyzer 12 to perform a morphological analysis of the user's question, and acquires a plurality of words included in the user's question. In addition, the search engine 15 refers to the customer synonym DB 21 on the basis of each acquired word, and retrieves synonyms corresponding to the user's question. Then, the search engine 15 refers to, on the basis of the retrieved synonyms, the question and the answer of the category selected by the user, which are acquired in advance from the question DB 19 as described above. As described above, the selected 10,000 synonyms are stored in the customer synonym DB 21. Therefore, as described above, it is possible to retrieve an appropriate answer to the user's question.

Next, the search engine 15 retrieves an answer on the basis of a synonym, thereby determining whether one answer candidate has been retrieved, whether two or more answer candidates have been retrieved, or whether an answer candidate could not have been retrieved (step S41).

Figure 13:
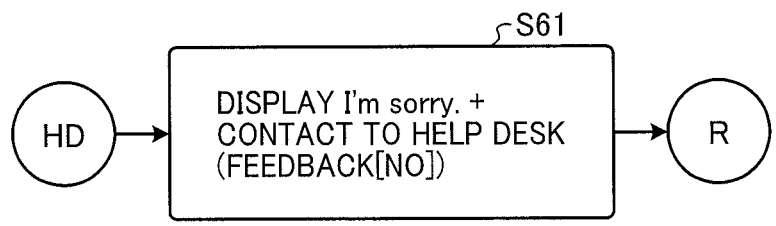
FIG. 13 is a flowchart that is another subroutine of the flowchart of FIG. 10.

When one answer candidate is retrieved, the search engine 15 displays the retrieved answer and the contact to the help desk, as described in step S51 to step S53 of FIG. 12 and step S61 of FIG. 13.

On the other hand, when a plurality of answer candidates are retrieved, the search engine 15 displays the display selection button of each answer candidate, for example, as illustrated in FIG. 14 (step S42), and displays the answer candidate specified by the display selection button (step S43, steps S51 to S53, and step S61). The example in FIG. 14 illustrates an example in which the answer candidate of "HOW TO DO REIMBURSEMENT" and "CONFIRM/CHANGE TRANSFER DESTINATION OF REIMBURSEMENT" is displayed in response to the user's question "I want to know about reimbursement.".

When the "no answer button" is operated, the search engine 15 displays the contact to the help desk (step S43 and step S61).

On the other hand, when an answer candidate to the question of the user cannot be detected, the search engine 15 displays, on the chat screen, an apology message and a message prompting a search again (step S44), and returns the process to step S31, and an initial screen (search method selection screen) of the chat screen is displayed on the user PC 3.

(Retrieve from Frequently Asked Questions)

Figure 15:
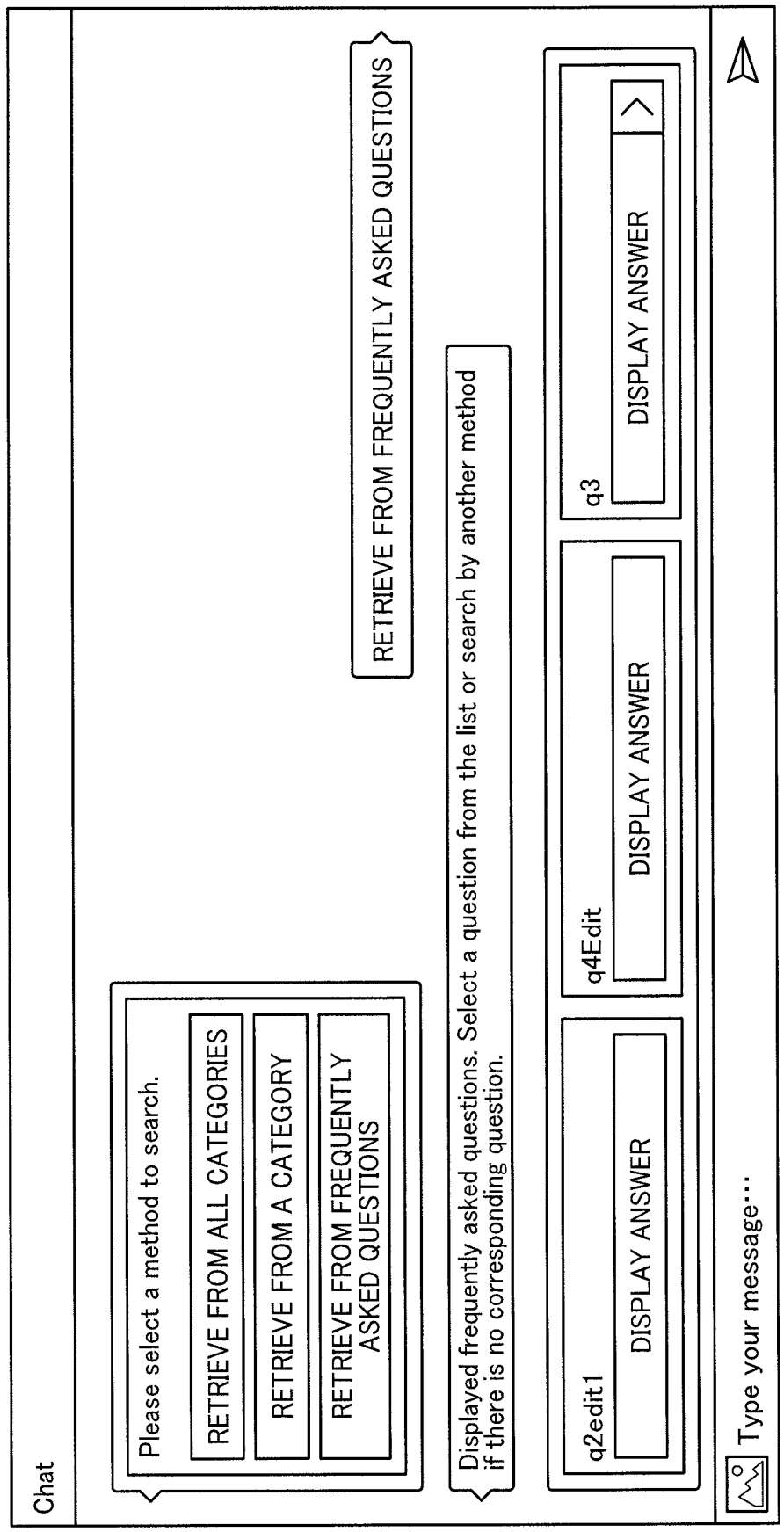
FIG. 15 is a diagram illustrating an example of a chat screen when a desired question is selected from frequently asked questions in the chatbot system, according to an embodiment of the present disclosure.

Next, when selecting a search method of "RETRIEVE FROM FREQUENTLY ASKED QUESTIONS" from the search method selection menu illustrated in FIG. 11, the user operates the user PC 3, and enters the characters "RETRIEVE FROM FREQUENTLY ASKED QUESTIONS" on the chat screen as illustrated in FIG. 15.

When a character input of "RETRIEVE FROM FREQUENTLY ASKED QUESTIONS" is detected, the search engine 15 refers to the query history DB to detect, for example, the top three (one, two, or four or more) questions with high frequency of query, and displays the questions in a list on the chat screen as illustrated in FIG. 15. The example of FIG. 15 is an example in which each question "q2edit1", "q4Edit" and "q3" is displayed in a list. In addition, the search engine 15 displays, on the chat screen, together with the list of each question, a specifying button for specifying another search method to which a message such as "Do you want to search by another method?" is attached (step S37).

Next, the search engine 15 monitors the presence or absence of the selection operation on the question displayed in the list or the presence or absence of the operation of the specifying button (step S38).

When a question desired by the user is selected and operated among the questions displayed in the list, the search engine 15 reads out an answer to the question from the question DB 19 and displays the answer on the chat screen (FIG. 12: step S51). As described above, each process in steps S51 to S53 in FIG. 12 and in step S61 in FIG. 13 is performed in accordance with the user's operation.

On the other hand, when the specifying button is operated, the search engine 15 returns the process to step S31. In this case, the user selects another search method, such as "RETRIEVE FROM ALL CATEGORIES" or "RETRIEVE FROM CATEGORY".

Effect of the Embodiment

As is clear from the above description, the chatbot system according to the embodiment selects, a synonym corresponding to a word with high frequency of appearance among the words extracted from the user's question, from the synonyms stored in the synonym DB 18, for a number that can be handled by the search engine 15 (the number of the synonyms may be smaller than the number that can be handle by the search engine 15), and stores the synonym in the customer synonym DB 21. That is, in descending order of the frequency in the user's question, the chatbot system extracts a synonym of each word with the high frequency from the synonym DB 18 and stores the synonym in the customer synonym DB 21.

Then, when retrieving an answer to a user's question, the chatbot system refers to the customer synonym DB 21, thereby retrieving the synonym corresponding to the word included in the user's question, and retrieves an answer to the user's question from the question DB 19 with the use of the word included in the user's question and the synonym retrieved from the customer synonym DB 21, and provides the answer to the user.

The synonyms extracted from the synonym DB 18 on the basis of the limitation of the number of synonyms that can be handled by the search engine 15 are synonyms corresponding to the words with high frequency of appearance in the question. Therefore, the search engine 15 can refer to a synonym of a word with high frequency of appearance to retrieve an answer corresponding to the question. Consequently, the search accuracy of the chatbot system according to the embodiment can be improved.

In the related art, the number of synonyms that a search engine used in the search device can handle is sometimes limited, such as to 10,000 words.

When the number of synonyms that the search engine can handle is limited, it means that the number of synonyms that can be used when referring to a dictionary based on a user's question is limited, thus causing the accuracy of match between the user's question and a retrieved answer degrades.

According to one aspect of the present disclosure, a search apparatus and a search method are provided that can improve search accuracy even when the number of synonyms that can be handled is limited.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A search apparatus comprising:
a memory to
store second sentences in association with past-input first sentences,
store synonyms corresponding to each of a plurality of words, and
store, in a database, association information associating each of the past-input first sentences with synonyms corresponding to each of words obtained by dividing each of the past-input first sentences; and
circuitry configured to
receive a newly-input first sentence on a chat screen,
divide each of the past-input first sentences into words and divide the newly-input first sentence into words,
detect, from the synonyms corresponding to each of the plurality words, the synonyms corresponding to each of the words obtained by dividing each of the past-input sentences,
establish the association information associating each of the past-input first sentences with the synonyms corresponding to each of the words obtained by dividing each of the past-input sentences,
determine appearance frequency of the synonyms corresponding to each of the words obtained by dividing each of the past-input sentences based on the association information in the database,
select, from the synonyms corresponding to each of the plurality of words stored in the memory, the synonyms corresponding to each of the words obtained by dividing each of the past-input first sentences, in descending order of the appearance frequency,
store the selected synonyms in the memory,
detect, from the selected synonyms stored in the memory, synonyms corresponding to each of the words obtained by dividing the newly-input first sentence, and
determine whether there is at least one of the second sentences, in the memory storing the second sentences, corresponding to the newly-input first sentence based on the detected synonyms and the words of the newly-input first sentence,
if there is at least one of the second sentences, in the memory storing the second sentences, corresponding to the newly-input first sentence based on the detected synonyms and the words of the newly-input first sentence, retrieve, from the memory storing the second sentences, the at least one of the second sentences corresponding to the newly-input first sentence based on the detected synonyms and the words of the newly-input first sentence and display the at least one of the second sentences on the chat screen,
when the at least one of the second sentences comprise two or more second sentences corresponding to the newly-input first sentence based on the detected synonyms and the words of the newly-input first sentence, display an indication that receives a selection of one of the two or more second sentences corresponding to the newly-input first sentence and an indication that receives a response indicating that no second sentence to be selected is present on the chat screen, and
when a selection of the indication that no second sentence to be selected is present is received, present a different option to give an answer.

2. The search apparatus according to claim 1,
wherein a number of synonyms that can be handled by the circuitry is specified in advance, and
wherein a number of the synonyms to be selected from the synonyms corresponding to each of the plurality of words and to be stored in the memory is equal to or less than the number of synonyms that can be handled by the circuitry.

3. The search apparatus according to claim 1,
wherein when a category of the newly-input first sentence is specified, the circuitry is further configured to:
preliminarily acquire one or more of the second sentences corresponding to the specified category from the second sentences stored in the memory in association with the past-input first sentences; and
retrieve the at least one of the second sentences corresponding to the newly-input first sentence from among the one or more of the second sentences preliminarily acquired in accordance with the category that is specified.

4. The search apparatus according to claim 1,
wherein each of the past-input first sentences and the newly-input first sentence is a sentence of a question, and each of the second sentences is a sentence of an answer to the question.

5. The search apparatus according to claim 1, wherein when it is determined that there is not at least one of the second sentences, in the memory storing the second sentences, corresponding to the newly-input first sentence based on the detected synonyms and the words of the newly-input first sentence, the circuitry is further configured to receive another newly-input first sentence.

6. A non-transitory computer readable medium that includes computer readable instructions that when executed by a processor cause the processor to perform steps, comprising:
receiving a newly-input first sentence on a chat screen;
dividing each of past-input first sentences into words;
detecting, from synonyms corresponding to each of a plurality words, synonyms corresponding to each of the words obtained by dividing each of the past-input sentences;
establishing association information associating each of the past-input first sentences with the synonyms corresponding to each of the words obtained by dividing each of the past-input sentences and storing the association information;
determining appearance frequency of the synonyms corresponding to each of the words obtained by dividing each of the past-input sentences based on the association information;
selecting, from the synonyms corresponding to each of the plurality of words stored in a memory, the synonyms corresponding to each of the words obtained by dividing each of the past-input first sentences, in descending order of the appearance frequency;
storing the selected synonyms in the memory;
dividing the newly-input first sentence into words;
detecting synonyms corresponding to each of the words obtained by dividing the newly-input first sentence, from the memory storing the synonyms corresponding to each of the words obtained by dividing each of the past-input first sentences selected in the descending order of appearance frequency of the words from the memory storing synonyms corresponding to each of the plurality of words;

determining whether there is at least one of the second sentences, in the memory storing the second sentences, corresponding to the newly-input first sentence based on the detected synonyms and the words of the newly-input first sentence;

under a condition that there is at least one of the second sentences, in the memory storing the second sentences, corresponding to the newly-input first sentence based on the detected synonyms and the words of the newly-input first sentence, retrieving, from the memory storing second sentences in association with the past-input first sentences, the at least one of the second sentences corresponding to the newly-input first sentence, based on the detected synonyms and the words of the newly-input first sentence and displaying the at least one of the second sentences on the chat screen; and under a condition that the at least one of the second sentences comprise two or more second sentences corresponding to the newly-input first sentence based on the detected synonyms and the words of the newly-input first sentence, displaying an indication that receives a selection of one of the two or more second sentences corresponding to the newly-input first sentence and an indication that receives a response indicating that no second sentence to be selected is present on the chat screen, and when a selection of the indication that no second sentence to be selected is present is received, presenting a different option to give an answer; and under a condition that there is not at least one of the second sentences, in the memory storing the second sentences, corresponding to the newly-input first sentence based on the detected synonyms and the words of the newly-input first sentence, receiving another newly-input first sentence.

* * * * *